United States Patent [19]

Urich

[11] Patent Number: 5,621,393
[45] Date of Patent: Apr. 15, 1997

[54] FILL-LEVEL TEST AND MEASURING DEVICE

[75] Inventor: Manfred Urich, Usingen, Germany

[73] Assignee: Unimess Messtechnische Geräte GmbH, Ober-Mörlen, Germany

[21] Appl. No.: 517,714

[22] Filed: Aug. 21, 1995

[30] Foreign Application Priority Data

Aug. 22, 1994 [DE] Germany .............................. 9413499 U

[51] Int. Cl.⁶ .................................................. G08B 21/00
[52] U.S. Cl. ............................ 340/616; 73/308; 335/207
[58] Field of Search ...................................... 340/616, 618, 340/620, 450, 623, 624; 200/84 C, 84 R; 73/308, 313; 335/207, 219

[56] References Cited

U.S. PATENT DOCUMENTS

| | | | |
|---|---|---|---|
| 4,142,079 | 2/1979 | Bachman | 340/624 |
| 4,379,434 | 4/1983 | Thordarson | 73/308 |
| 4,481,389 | 11/1984 | Johnson | 200/84 C |
| 4,796,473 | 1/1989 | Custer | 340/624 |
| 4,821,022 | 4/1989 | Jannotta | 200/84 C |
| 4,843,193 | 6/1989 | Budecker et al. | 73/308 |
| 5,150,614 | 9/1992 | Urich | 73/308 |

FOREIGN PATENT DOCUMENTS 2442875 11/1975 Germany .
2854284 8/1979 Germany .

*Primary Examiner*—Jeffery Hofsass
*Assistant Examiner*—Timothy Edwards, Jr.
*Attorney, Agent, or Firm*—Nikaido, Marmelstein, Murray & Oram LLP

[57] ABSTRACT

The invention concerns a filling level measuring device composed of a nonmagnetic slide tube (7) containing a switch (8) driven magnetically in contactless manner and mounted on a plate (1) sealing a container aperture, further of a float (23) displaceably resting on the slide tube (7) and fitted with a first permanent magnet (24) actuating the switch (8). The float (23) of this invention further includes a second permanent magnet (25) a distance from the permanent magnet (24) associated to the switch (8), this second permanent magnet (25) resting by its own magnetic field on the magnetic field of an oppositely polarized permanent magnet (15) affixed to the slide tube (7). A magnetic coil (17) is affixed to the slide tube (7) which when energized generates a magnetic field reinforcing the effect of the oppositely polarized magnetic field and is of such field intensity that the float (23) is lifted into the switching position without being supported by buoyancy.

5 Claims, 1 Drawing Sheet

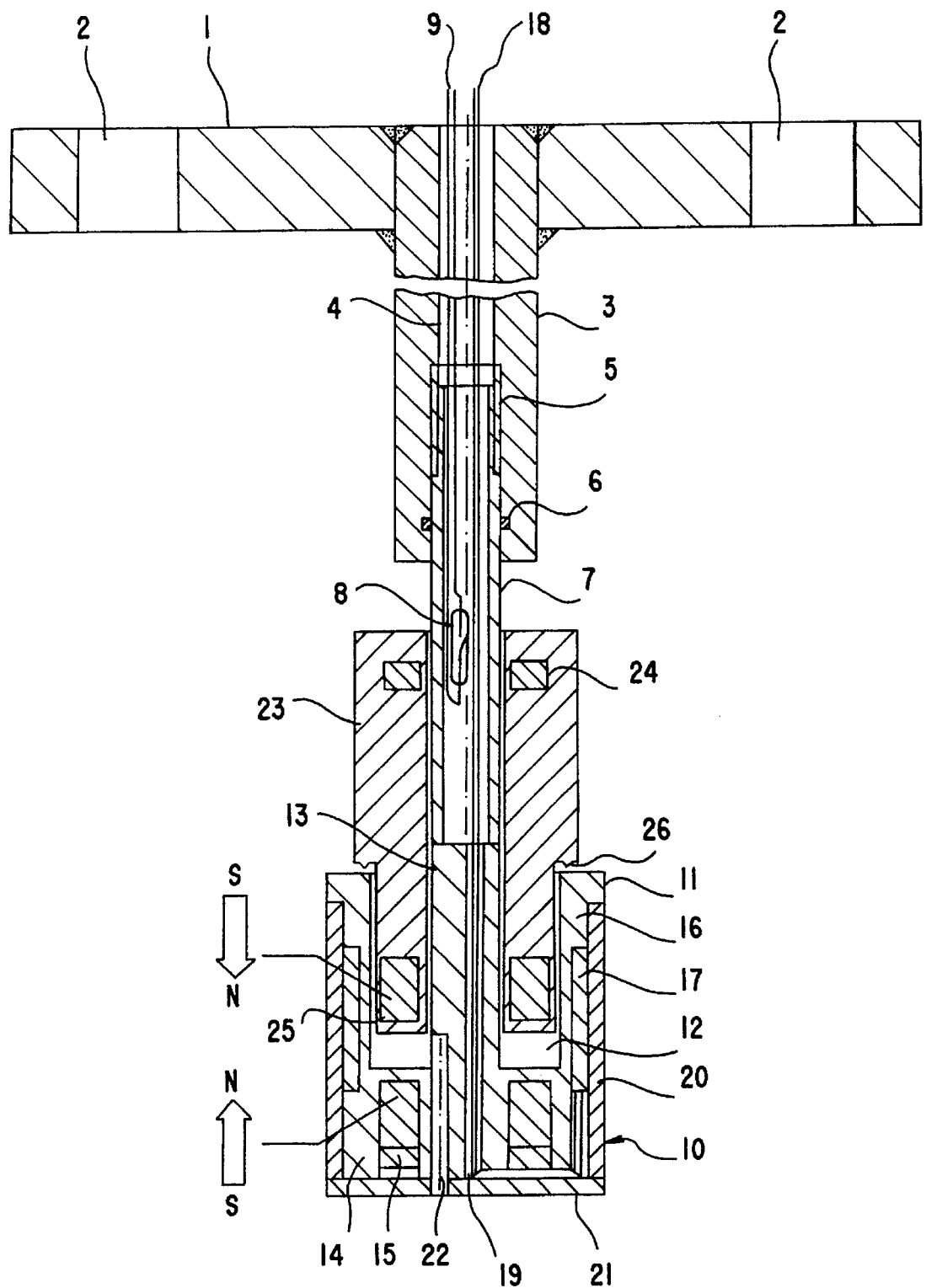

the equipment of the engineering needed in the liquid container. A non-magnetic slide tube 3 is configured on the planar plate 1. Proceeding from the plate 1, the slide tube 3 contains, consecutively an annular permanent magnet 4, an electric coil 5 and a magnetic switch 6, for instance a Reed switch. This Reed switch 6 is connected by electric leads 7 through the plate 1 to a terminal box 8, as is also the coil 5 by electric leads 9.

FILL-LEVEL TEST AND MEASURING DEVICE

BACKGROUND OF THE INVENTION

The invention concerns a filling-level measuring device, in particular serving as an overfilling safety means for a liquids container, comprising a non-magnetic slide tube which contains a magnetic switch driven in contactless manner and mounted to a plate or threaded connection sealing a container aperture, further comprising a float displaceable resting on the slide tube and containing a permanent magnet driving the switch, said float being displaceable, by an electromagnetic actuator, independently of the filling level, into a switching position driving said switch into another position.

Filling-level measuring devices of the above kind allow remote-controlled monitoring of their operability. By driving the electromagnetic actuator, the float may be tested for adequate displaceability, and the switch for switching ability.

In a filling-level measuring device of this kind known from U.S. Pat. No. 5,150,614, the electromagnetic actuator consisting of a magnetic coil is mounted on the outside of the plate or threaded connection and the magnetic core is linked to the float by a corrosionproof wire cable passing through a borehole or threaded connection. The cable prevents transmitting the weight of the magnetic core to the float. This known system has been found practical. However it is designed solely for hollow floats and the float's sealing against liquids must be watched by a pressure sensor.

The German Offenlegungsschrift 28 54 284 discloses a magnetically driven float switch for monitoring a liquid level, where the float comprises a permanent magnet for switch actuation and in addition to said magnet a permanent-magnet system which together with a magnet displaceable in a slide tube guiding the float generates magnetic holding when the latter magnet is in the vicinity of the additional permanent-magnet system. A lifting mechanism allows raising the magnet inside the slide tube until the float is liftable on account of said holding from its lower limit position into operational test range. In the rest position, the displaceable lifting magnet is located outside the effective range of interaction with the float-borne magnet-system. This known apparatus is comparatively complex and furthermore it is not intended fro remote control. The permanent-magnet system increases the float weight and entails a larger float volume.

Furthermore the German Offenlegungsschrift 24 42 875 discloses a float/magnetic-switch wherein a solid float per se will not float in liquids of lesser densities than its own. To achieve float buoyancy in the liquid, the float is made to float by the magnetic field of a permanent magnet located at the lower float portion, on the magnetic field of an oppositely polarized permanent magnet affixed underneath the float to the slide tube. If liquid floods over the float, it shall be lifted by the mutually opposing magnetic fields until the magnetic field of the permanent magnet mounted on the float drives the switch inside the slide tube.

OBJECT AND SUMMARY OF THE INVENTION

The object of the invention is to create a float of the initially cited kind which is characterized by simple mechanical design, low manufacturing complexity and high operational reliability.

The invention solves this problem in that the float comprises a second permanent magnet spaced from that permanent magnet which is associated with the switch, said second permanent magnet resting by its magnetic field on that of an oppositely polarized permanent magnet affixed to the slide tube, and in that a magnetic coil is mounted to the slide tube which when energized generates a magnetic field of such field intensity as to reinforce the effect of said oppositely polarized magnetic field, so that, without resort to buoyancy, the float shall be raised into the switching position.

Aside guiding the float on the slide tube, the filling-level measuring device of the invention is free of mechanical linkage between the displaceable float and the stationary slide tube and affixed components. All the forces which must be transmitted when monitoring the filling level and when testing operability between the displaceable float and stationary slide tube are transmitted by magnetic fields. As a result the mechanical design of the device is simple and high operational reliability is achieved.

Both the float and the slide tube with its affixed components may be enclosed by a fully sealed protective layer allowing high resistance to corrosive media. The float weight or a substantial portion of it is compensated by the action of the permanent magnet of opposite polarization at the lower float end and at the slide tube, and as a result the float may be solid. Consequently it is no longer necessary to monitor that the float remains sealed, and its corrosion resistance furthermore is enhanced because even in the event of float-surface damage by corrosive media, the float will remain operational. Moreover the design of the filling-level measuring device of the invention offers the advantage that lifting the float for purposes of operational testing only requires a comparatively slight additional magnetic force, and hence the magnetic coil generating this additional magnetic force may be comparatively small. Also, the float being solid, it is further insensitive to pressures prevailing in the space being monitored.

If the filling-level measuring device of the invention on the other hand comprises a hollow float, then its sealed condition may be monitored by the switch driven in contactless manner by magnetic force, said switch being switched also when the float sinks, on account of increased weight from liquid entering into the unsealed cavity, from its normal rest position wherein it is supported by the oppositely polarized permanent magnets.

In one advantageous embodiment of the device of the invention, a pot-shaped housing is affixed by its base to the lower end of the slide tube, the cylindrical wall of said housing enclosing the slide tube at such concentric spacing that the slide-tube mounted float may enter the housing by its lower end containing an annular permanent magnet, the oppositely polarized permanent magnet being mounted in the base of the pot-shaped housing and the housing wall comprising an annular cavity receiving the magnetic coil. An aperture in the housing bottom prevents liquid from accumulating in the inner space surrounded by the housing wall.

BRIEF DESCRIPTION OF THE DRAWING

The invention is elucidated below in relation of an embodiment shown in the drawing. The drawing is a vertical section of an overfilling-safety device of the invention.

DETAILED DESCRIPTION OF PREFERRED EMBODIMENT

The overfilling safety device shown in the drawing comprises a planar plate 1 with affixing boreholes 2 and suitable to seal a container aperture. A support tube 3 is mounted perpendicularly and centrally to the plate 1 and runs from this plate 1 downward, comprising a borehole 4 with a lower-end inside thread 5 and an annular groove with a sealing ring 6. The externally threaded end of a slide tube 7 is screwed from below into the support tube 3 and is sealed by means of the sealing ring 6 relative to the support tube 3. A magnetically driven reed switch 8 is present in the slide tube 7 and is connected by leads 9 to a monitoring circuit. The leads 9 run upward through the slide tube 7 and the support tube 3.

A housing 10 is affixed to the lower end of the slide tube 7. The housing 10 is composed of an inner, pot-shaped housing body 11 with a cylindrical inner space 12 receiving a pin 13 connecting the housing to the slide tube 7. The outside diameter of the pin 13 is the same as that of the slide tube 7, and accordingly its surface extends the downward sliding surface formed by the outer surface of the slide tube 7. An annular permanent magnet 15 is mounted from below into the base 14 of the housing body 11. Furthermore, an annular recess receiving a magnetic coil 17 is present in the sidewall 16 of the housing body 11. The magnetic coil is connected through leads 18 to an electric control circuit. The leads 18 run upward through grooves in the outsides of the housing body 11, through a longitudinal borehole 19 in the pin 13, the slide tube 7 and the support tube 3. The sidewall of the housing body 11 is externally enclosed by a cylindrical case 20 connected in sealing manner by bonding or welding to the wall 16. The lower end of the case 20 is tightly sealed by a plate 21 wholly covering the base 14 of the housing body 11. A borehole 22 passing through the base 14 and the plate 21 represents a drainage duct for the cavity 12.

A float 23 in the form a cylindrical bush rests displaceably on the slide tube 7 and on the pin 13. The float 23 is a solid of low density, for instance a plastic. Near its upper end it contains an annular permanent magnet 24 to drive a reed-switch 8. The float 23 enters the inside space 12 of the housing 10 by its lower end of lesser diameter. The float comprises at said lower end an annular permanent magnet 25 of which the poles are opposite those of the permanent magnet 15, as a result of which the magnetic fields of the two magnets 15, 25 are mutually repellent.

The drawing shows the float in its rest position, wherein it does not dip into a liquid. In this position the float 23 is supported, in whole or in part, depending on design, by the mutually repellent fields of the permanent magnets 15, 25. If the repellent forces of the permanent magnets 15, 25 are somewhat less than the weight of the float 23, then this float will additionally rest by stops 26 on the housing 10. In this position of the float 23, the reed switch 8 is kept closed by the permanent magnet 24. The monitoring circuit is in the form of a rest-position current circuit.

When checking the operability of the overfilling safety device, the magnetic coil 17 is connected in such manner to a DC source that the magnetic field generated by the coil 17 reinforces the effects of the mutually repellent magnetic fields of the permanent magnets 15, 25 until the float 23 is lifted and the reed switch 8 is actuated. The opening of the monitoring circuit so achieved then indicates that the reed switch does switch. It may then be inferred that the float 23 also will be lifted by buoyancy and the reed switch 8 will open the monitoring circuit when the maximum filling level shall be reached. Once the magnetic coil 17 is de-energized, the float drops back into its initial position.

The illustrative embodiment shows that the filling-level measuring device described above is especially well suited for containers holding corrosive liquids. All externally free device components may be made of plastics especially resistant to acids and lyes. The permanent magnets are fully imbedded in the float or in the housing and as a result are protected from corrosive media, and so are the magnetic coil and the switch.

I claim:

1. Filling-level measuring device, in particular an overfilling safety means for a liquid container, comprising a non-magnetic slide tube containing a switch driven in contactless manner by magnetic force and mounted to a plate or threaded connection sealing a container aperture, further comprising a float displaceable resting on the slide tube and comprising a permanent magnet to actuate the switch and displaceable regardless of filling level, by an electromagnetic actuator, into a switch position effecting switching of the switch, characterized in that the float (23) comprises a second permanent magnet (25) a distance from the permanent magnet (24) associated to the switch (8), said permanent magnet (25) resting by its own magnetic field on the magnetic field of an oppositely polarized permanent magnet (15) affixed to the slide tube (7), and in that a magnetic coil (17) is affixed to the slide tube (7) which, when energized, generates a magnetic field reinforcing the effect of the oppositely polarized magnetic field and of such field intensity that the float (23) is lifted into the switching position without being supported by buoyancy.

2. Filling level measuring device defined in claim 1, characterized in that the float (23) is solid and consists of a low-density material.

3. Filling level measuring device defined in claim 1, characterized in that it comprises a hollow float of which the sealed state is monitored by the switch which is magnetically driven in contactless manner, said switch being switched when the float sinks below its normal rest position wherein it is supported by the oppositely polarized permanent magnets.

4. Filling level measuring device defined in claim 1, 2 or 3, characterized in that a pot-shaped housing (10) is affixed by its base (14) to the lower end of the slide tube (7) and comprises a cylindrical wall (16) enclosing the slide tube (7) at such a concentric distance that the float (23) mounted on the slide tube (7) can be moved by its lower end containing an annular permanent magnet (25) into the housing (10), the oppositely polarized permanent magnet (15) being mounted in the base (14) of the pot-shaped housing (10) and the housing wall (16) comprising an annular cavity receiving the magnetic coil (17).

5. Filling level measuring device defined in claim 4, characterized in that an aperture (22) in the base (14) of the housing (10) issues into the inner space (12) enclosed by the housing wall (16).

* * * * *